United States Patent
Kwon et al.

(10) Patent No.: US 8,942,196 B2
(45) Date of Patent: Jan. 27, 2015

(54) DOWNLINK CONTROL INFORMATION RECEIVING METHOD IN WIRELESS COMMUNICATION SYSTEM AND APPARATUS THEREFOR

(75) Inventors: Yeong Hyeon Kwon, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 13/255,423

(22) PCT Filed: Apr. 8, 2010

(86) PCT No.: PCT/KR2010/002177
§ 371 (c)(1),
(2), (4) Date: Sep. 8, 2011

(87) PCT Pub. No.: WO2010/117225
PCT Pub. Date: Oct. 14, 2010

(65) Prior Publication Data
US 2012/0008586 A1  Jan. 12, 2012

Related U.S. Application Data

(60) Provisional application No. 61/167,539, filed on Apr. 8, 2009.

(30) Foreign Application Priority Data

Apr. 6, 2010 (KR) ........................ 10-2010-0031284

(51) Int. Cl.
*H04W 4/00* (2009.01)
*H04L 5/00* (2006.01)
*H04W 72/04* (2009.01)
*H04L 1/18* (2006.01)

(52) U.S. Cl.
CPC .......... *H04L 5/0053* (2013.01); *H04W 72/042* (2013.01); *H04L 1/1893* (2013.01)
USPC ........................................... 370/329; 370/341

(58) Field of Classification Search
None
See application file for complete search history.

(56) References Cited

U.S. PATENT DOCUMENTS

| | | | |
|---|---|---|---|
| 2003/0112773 A1 | 6/2003 | Lee et al. | |
| 2010/0165847 A1* | 7/2010 | Kamuf et al. | 370/241 |
| 2010/0215011 A1* | 8/2010 | Pan et al. | 370/329 |
| 2010/0303011 A1* | 12/2010 | Pan et al. | 370/328 |

FOREIGN PATENT DOCUMENTS

| | | |
|---|---|---|
| KR | 10-2008-0066778 A | 7/2008 |
| WO | WO 2007/044414 A1 | 4/2007 |

* cited by examiner

*Primary Examiner* — Ayaz Sheikh
*Assistant Examiner* — Sori Aga
(74) *Attorney, Agent, or Firm* — Birch, Stewart, Kolasch & Birch, LLP

(57) ABSTRACT

The present invention discloses a method for receiving downlink control information by a terminal in a wireless communication system. More specifically, the method comprises the steps of receiving a coordination field from a base station and receiving control information on more than one component carrier that is allocated to the terminal, on the basis of the coordination field, wherein the coordination field includes more than one parameter for decoding the control information on the more than one component carrier.

10 Claims, 12 Drawing Sheets

FIG. 2
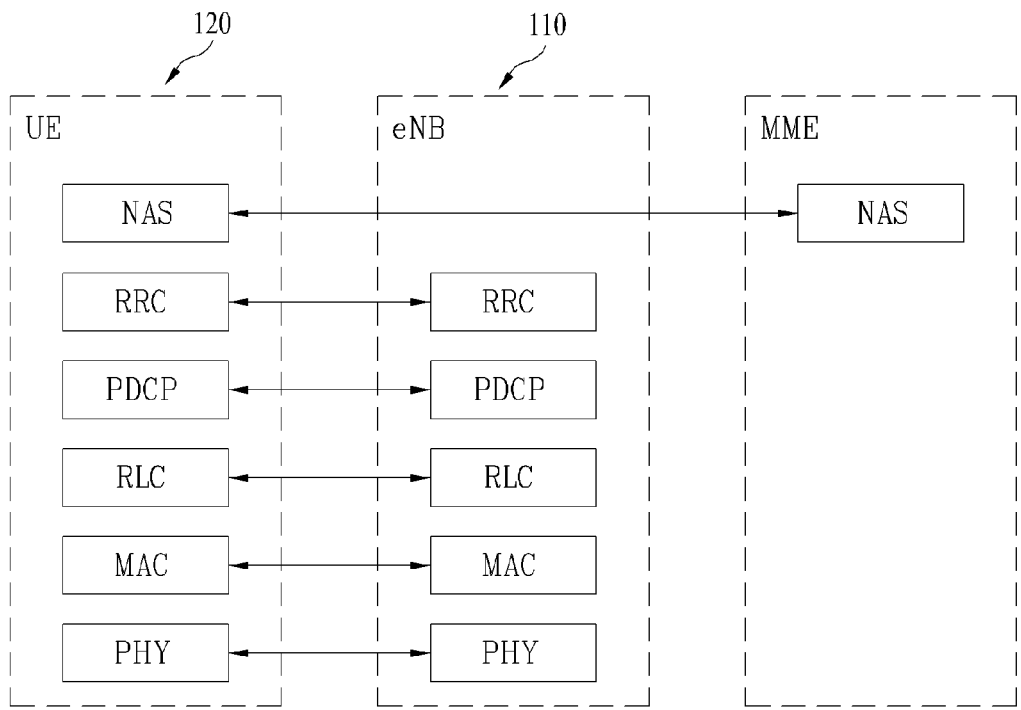
(a) control-plane protocol stack
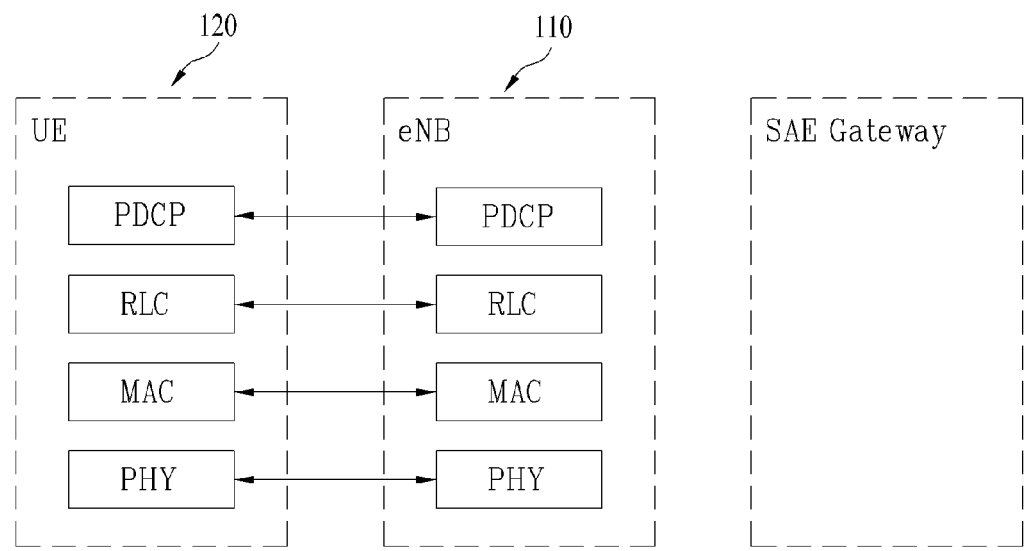
(b) user-plane protocol stack FIG. 8
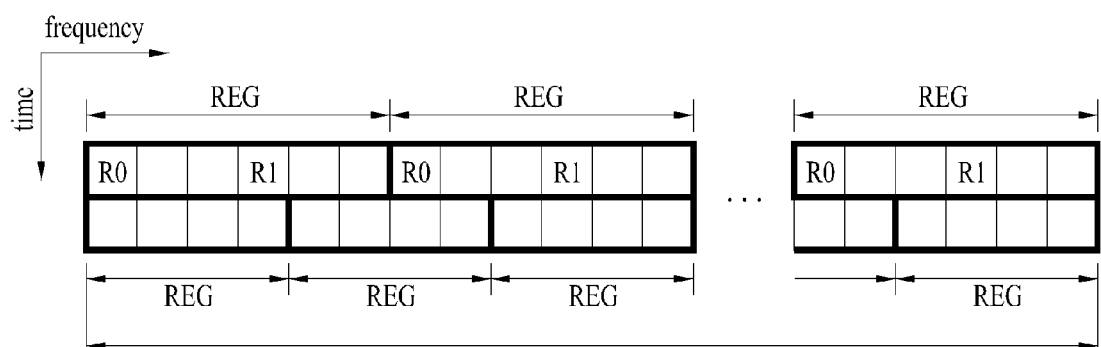
(a) 1TX or 2TX
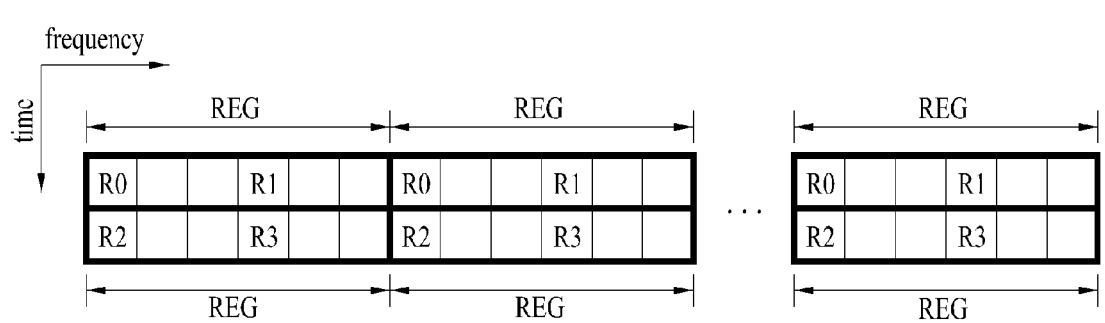
(b) 4 TX

DOWNLINK CONTROL INFORMATION RECEIVING METHOD IN WIRELESS COMMUNICATION SYSTEM AND APPARATUS THEREFOR

CROSS REFERENCE TO RELATED APPLICATIONS

This application is a National Phase of International Application No. PCT/KR2010/002177 filed on Apr. 8, 2010 which claims the benefit under 35 U.S.C. §119(e) of U.S. Provisional Application No. 61/167,539 filed on Apr. 8, 2009 and to Patent Application No. 10-2010-0031284 filed in the Republic of Korea, on Apr. 6, 2010. The entire contents of all of the above applications are hereby incorporated by reference.

FIELD OF THE INVENTION

The present invention relates to a wireless communication system, and more particularly, to a method for receiving downlink control information at a user equipment of a wireless communication system to which carrier aggregation is applied and an apparatus for the same.

BACKGROUND ART

A $3^{rd}$ generation partnership project long term evolution (3GPP LTE), LTE-Advanced (hereinafter, referred to as 'LTE-A') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, the carrier aggregation aims to use a plurality of frequency blocks as one great logical frequency band. A bandwidth of each frequency block can be defined based on a bandwidth of a system block used in the LTE system. Each frequency block is transmitted using a component carrier. In this specification, the component carrier may mean a component carrier for carrier aggregation or a central carrier of the component carrier depending on the context. The component carrier for carrier aggregation and the center carrier of the component carrier may be used together.

SUMMARY OF THE INVENTION

An object of the present invention devised to solve the conventional problem is to provide a method for receiving downlink control information at a user equipment of a wireless communication system to which carrier aggregation is applied and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving downlink control information by a user equipment in a wireless communication system to which carrier aggregation is applied comprises the steps of receiving a coordination field from a base station; and receiving control information on one or more component carriers that are allocated to the user equipment, on the basis of the coordination field, wherein the coordination field includes one or more parameters for decoding the control information on the one or more component carriers. In this case, the coordination field is preferably received through a reference component carrier.

The one or more parameters include a control channel element (CCE) index where the control information is located, or a search space index indicating a position for decoding in a search space and an aggregation level corresponding to the position for decoding. The one or more parameters further include at least one of the aggregation level of the control information and information as to whether the control information exists in the one or more component carriers allocated to the user equipment.

More preferably, the CCE index where the control information is located is expressed by an offset value based on CCE index of the coordination field.

In another aspect of the present invention, a user equipment in a wireless communication system to which carrier aggregation is applied comprises a receiving module receiving a coordination field from a base station; and a processor acquiring control information on one or more component carriers that are allocated to the user equipment, on the basis of the coordination field, wherein the coordination field includes one or more parameters for decoding the control information on the one or more component carriers. In this case, the coordination field is preferably received through a reference component carrier.

The one or more parameters include a control channel element (CCE) index where the control information is located, or a search space index indicating a position for decoding in a search space and an aggregation level corresponding to the position for decoding. The one or more parameters further include at least one of the aggregation level of the control information and information as to whether the control information exists in the one or more component carriers allocated to the user equipment.

More preferably, the CCE index where the control information is located is expressed by an offset value based on CCE index of the coordination field.

In still another aspect of the present invention, a method for allocating a resource for transmission of downlink control information from a base station of a wireless communication system to which carrier aggregation is applied comprises the steps of mapping control information on one or more component carriers allocated to a user equipment into a control region of each component carrier; and mapping a coordination field into a control region of a reference component carrier, wherein the coordination field includes one or more parameters related to a position where the control information is mapped into the control region of the one or more component carriers.

In further still another aspect of the present invention, a base station in a wireless communication system to which carrier aggregation is applied comprises a processor mapping control information on one or more component carriers allocated to a user equipment into a control region of each component carrier, and mapping a coordination field into a control region of a reference component carrier; and a transmitting module transmitting the mapped control information and the mapped coordination field to the user equipment, wherein the coordination field includes one or more parameters related to a position where the control information is mapped into the control region of the one or more component carriers.

According to the embodiments of the present invention, downlink control information can effectively be received in a wireless communication system to which a carrier aggregation scheme is applied. Also, the user equipment can detect control information corresponding to each component carrier more effectively by using the downlink control information.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and E-UTRAN based on the 3GPP radio access network standard;

FIG. 8 is a diagram illustrating a resource unit used to constitute a control channel;

DETAILED DESCRIPTION OF THE INVENTION

Figure 1:
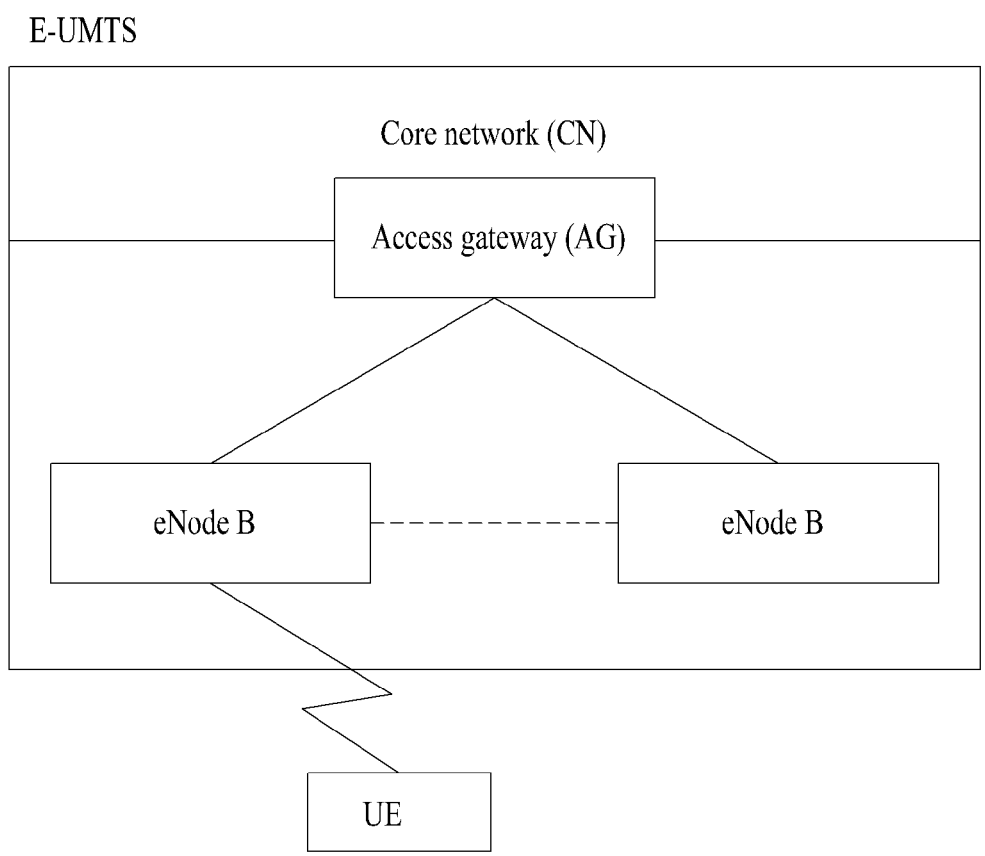
FIG. 1 is a diagram illustrating a network structure of an Evolved Universal Mobile Telecommunications System (E-UMTS), which is an example of a mobile communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of component carriers and uses at least one or more component carriers as a system block of a legacy system will be referred to as an evolved system or a wideband system. The component carrier used as a legacy system block has the same size as that of the system block of the legacy system. On the other hand, there is no limitation in sizes of the other component carriers. However, for system simplification, the sizes of the other component carriers may be determined based on the size of the system block of the legacy system. For example, the 3GPP LTE (Release-8) system and the 3GPP LTE-A (Release-9) system are evolved from the legacy system.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system in this specification, the LTE system and the LTE-A system are only exemplary, and the embodiment of the present invention can be applied to all communication systems corresponding to the aforementioned definition. Also, although the embodiment of the present invention will be described based on an FDD mode in this specification, the FDD mode is only exemplary, and the embodiment of the present invention can easily be applied to an H-FDD mode or a TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB 220 is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
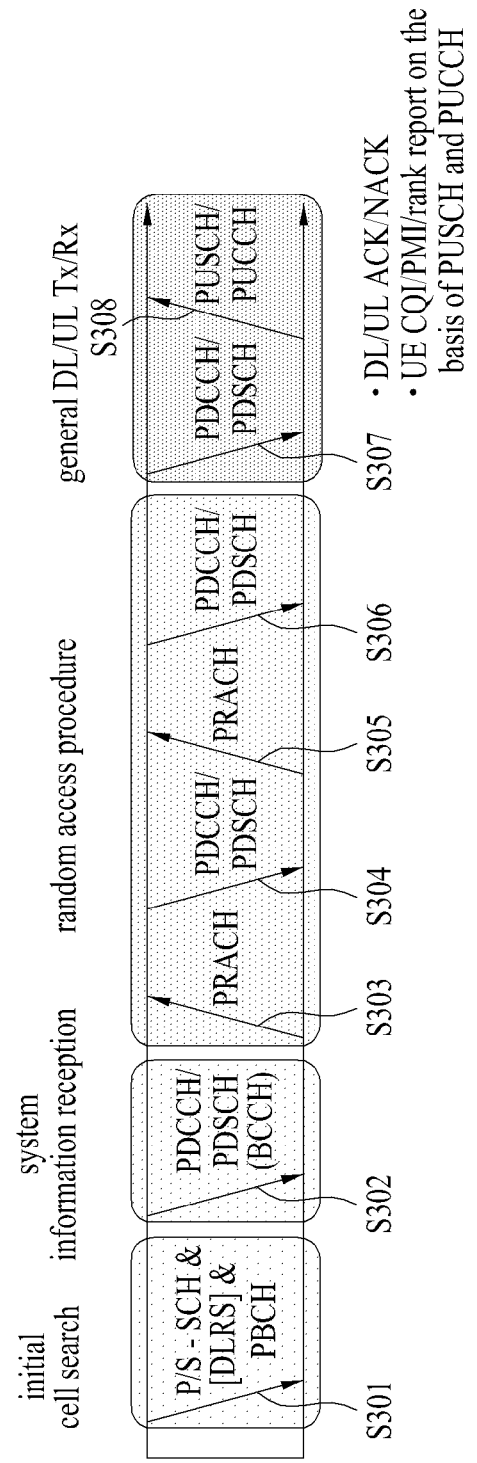
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) in the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the mean time, if the user equipment initially accesses the base station, or if there is no radio resource for signal transmission, the user equipment performs a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
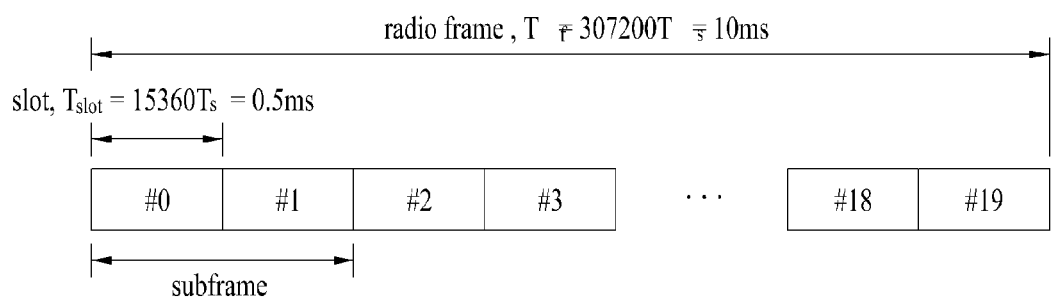
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms (327200·$T_s$) and includes ten (10) subframes of an equal size. Each sub frame has a length of 1 ms and includes two slots. Each slot has a length of 0.5 ms (15360·$T_s$). In this case, $T_s$ represents a sampling time, and is expressed by $T_s=1/(15 \text{ kHz} \times 2048)=3.2552 \times 10^8$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
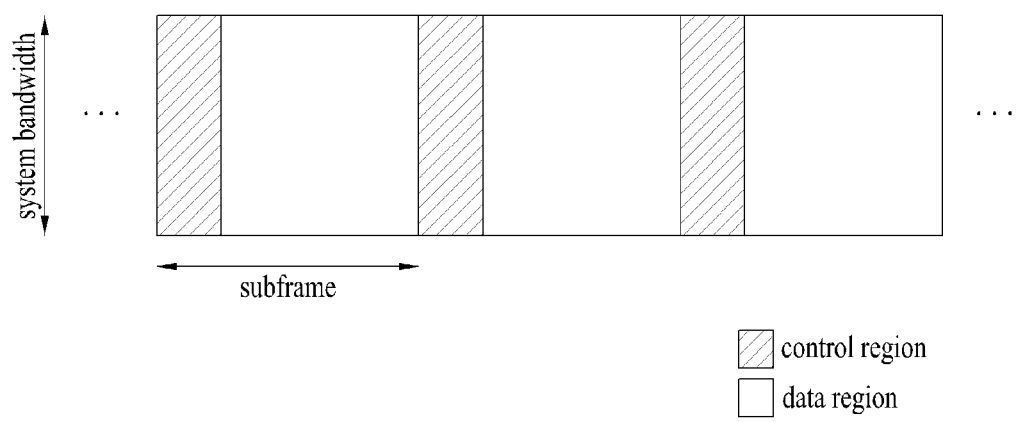
FIG. 5 is a diagram illustrating a functional structure of a downlink radio frame.

FIG. 5 is a diagram illustrating a functional structure of a downlink radio frame.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control channel and a data region for transmission of downlink data. The control region starts from the first OFDM symbol of the subframes and includes one or more OFDM symbols. The control region may have a size set independently per subframe. The control region is used to transmit L1/L2 (layer 1/layer 2) control signals. The data region is used to transmit downlink traffic.

Figure 6:
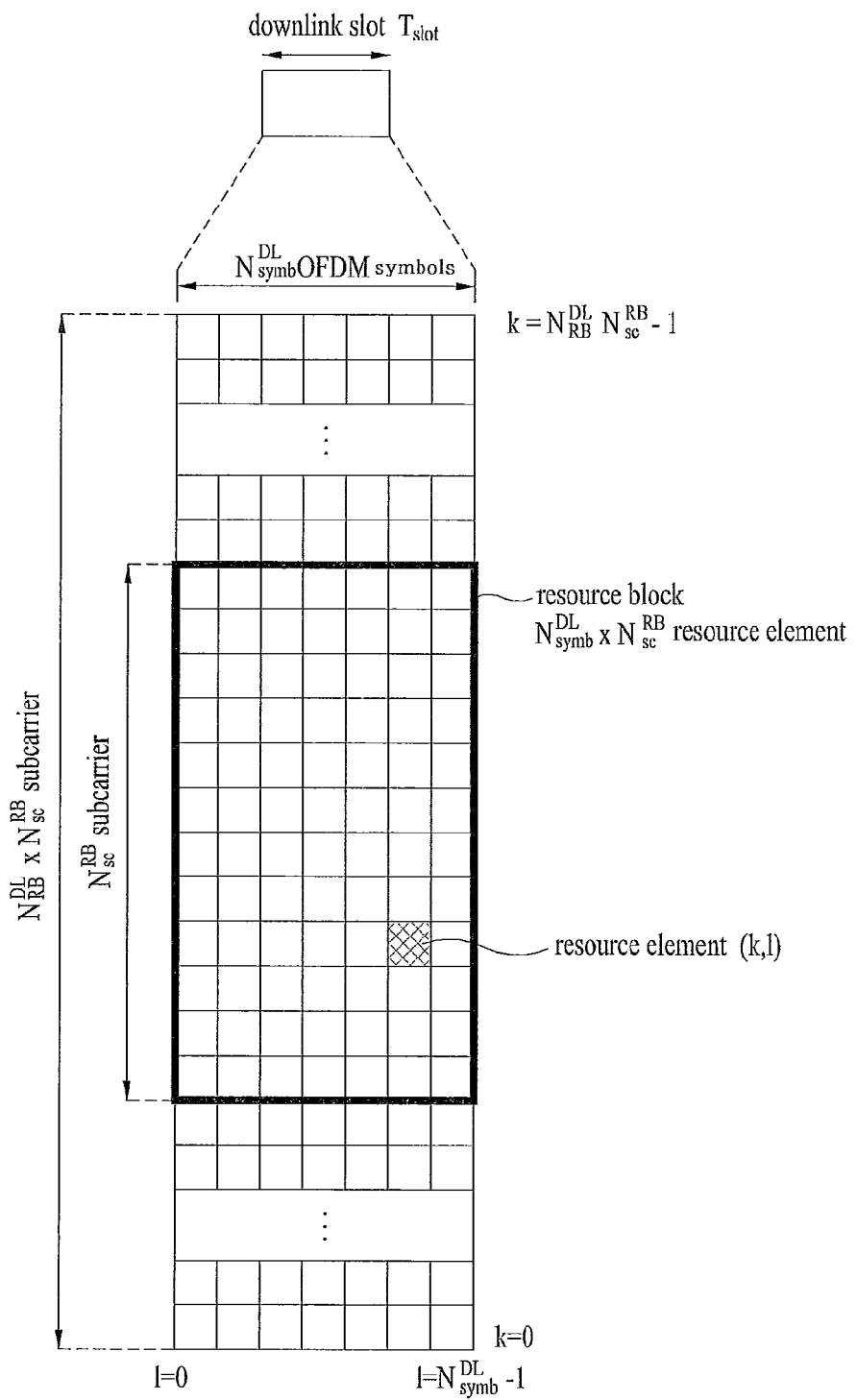
FIG. 6 is a diagram illustrating a resource grid of a downlink slot.

FIG. 6 is a diagram illustrating a resource grid of a downlink slot.

Referring to FIG. 6, the downlink slot includes $N_{symb}^{DL}$ number of OFDM symbols in a time region and $N_{RB}^{DL}$ number of resource blocks in a frequency region. Since each resource block includes $N_{sc}^{RB}$ number of subcarriers, the downlink slot includes $N_{RB}^{DL} \times N_{sc}^{RB}$ number of subcarriers in the frequency region. Although an example of FIG. 6 illustrates that the downlink slot includes seven OFDM symbols and the resource block includes twelve subcarriers, the present invention is not limited to the example of FIG. 6. For example, the number of OFDM symbols included in the downlink slot may be varied depending on a length of cyclic prefix (CP).

Each element on the resource grid will be referred to as a resource element (RE). One resource element is indicated by one OFDM symbol index and one subcarrier index. One resource block (RB) includes $N_{symb}^{DL} \times N_{sc}^{RB}$ number of resource elements. The number $N_{RB}^{DL}$ of resource blocks included in the downlink is subjected to a downlink transmission bandwidth established in a cell.

Figure 7:
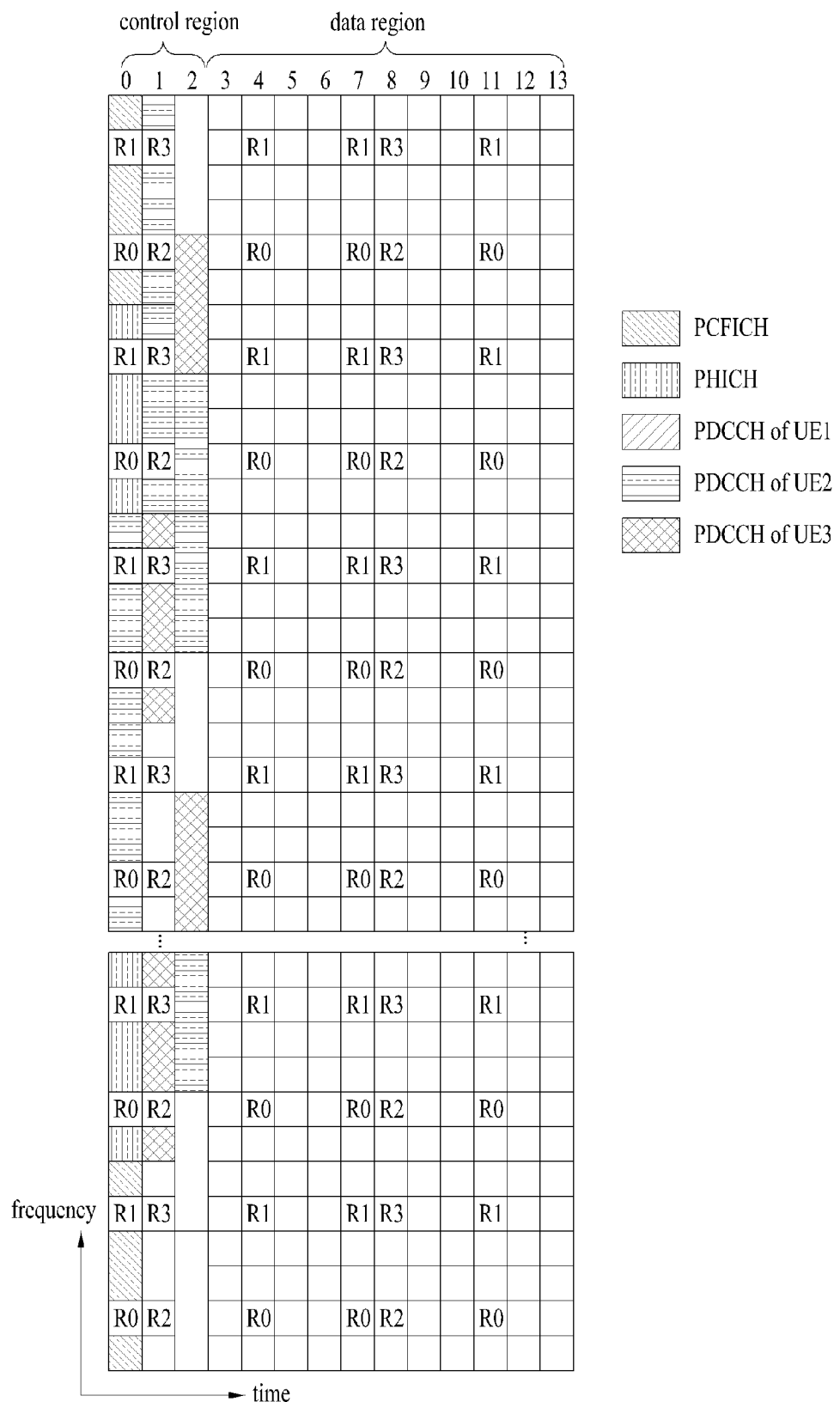
FIG. 7 is a diagram illustrating a control channel included in a control region of a subframe.

FIG. 7 is a diagram illustrating a control channel included in a control region of a subframe.

Referring to FIG. 7, the subframe includes fourteen (14) OFDM symbols. First one to three OFDM symbols are used as the control region in accordance with establishment of subframe, and other thirteen to eleven OFDM symbols are used as the data region.

In FIG. 7, R1 to R4 represent reference signals (RS) of antennas 0 to 3. The RS is fixed by a given pattern within the subframe regardless of the control region and the data region. The control channel is allocated to a resource to which the RS is not allocated in the control region, and the traffic channel is also allocated to a resource to which the RS is not allocated in the data region. Examples of the control channel include PCFICH (Physical Control Format Indicator CHannel), PHICH (Physical Hybrid-ARQ Indicator CHannel), and PDCCH (Physical Downlink Control CHannel).

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each of which is distributed in the control region based on cell ID. One REG includes four REs. The structure of the REG will be described in detail with reference to FIG. 8. The PCFICH value indicates values of 1 to 3, and is modulated by Quadrature Phase Shift Keying (QPSK).

The PHICH is used to transmit HARQ ACK/NACK signals for uplink transmission. The PHICH includes three REGs, and is cell-specifically scrambled. The ACK/NACK signals are indicated by 1 bit, and are spread by a spreading factor (SF)=2 or 4, wherein spreading is repeated three times. A plurality of PHICHs can be mapped with the same resource. The PHICH is modulated by Binary Phase Shift Keying (BPSK).

The PDCCH is allocated to first n number of OFDM symbols of the subframe, wherein n is an integer greater than 1 and is indicated by the PCIFCH. The PDCCH includes one or more CCEs, which will be described in detail later. The PDCCH notifies each user equipment or user equipment group of information related to resource allocation of transport channels, i.e., a paging channel (PCH) and a downlink-shared channel (DL-SCH), uplink scheduling grant, HARQ information, etc.

The PCH and the DL-SCH are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted through the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI "A", the user equipments receive the PDCCH and receive the PDSCH indicated by "B" and "C" through information of the received PDCCH.

FIG. 8(*a*) and FIG. 8(*b*) illustrate resource units used to configure a control channel. FIG. 8(*a*) illustrates that the number of transmitting antennas belonging to the base station is 1 or 2, and FIG. 8(*b*) illustrates that the number of transmitting antennas belonging to the base station is 4. In FIG. 8(*a*) and FIG. 8(*b*), different reference signal patterns are illustrated depending on the number of transmitting antennas but a method of establishing a resource unit related to a control channel is illustrated equally.

Referring to FIG. 8(*a*) and FIG. 8(*b*), a basic resource unit of the control channel is REG. The REG includes four neighboring resource elements excluding the reference signals. The REG is illustrated with a solid line. The PCFIC and the PHICH include four REGs and three REGs, respectively. The PDCCH is configured in a unit of CCE (control channel element), one CCE including nine REGs.

The user equipment is established to identify M(L) (≥L) number of CCEs arranged continuously or arranged by a specific rule, whereby the user equipment may identify whether the PDCCH of L number of CCEs is transmitted thereto. A plurality of L values may be considered by the user equipment to receive the PDCCH. CCE sets to be identified by the user equipment to receive the PDCCH will be referred to as a search space. For example, the LTE system defines the search space as expressed in Table 1.

TABLE 1

| | Search space $S_k^{(L)}$ | | | |
|---|---|---|---|---|
| Type | Aggregation level L | Size [in CCEs] | PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L represents the number of CCEs constituting the PDCCH, $S_k^{(L)}$ represents a search space of the CCE aggregation level L, and $M^{(L)}$ represents the number of PDCCH candidates to be monitored in the search space.

The search space may be divided into a UE-specific search space that allows access to only a specific user equipment and a common search space that allows access to all user equipments within a cell. The user equipment monitors a common search space of the CCE aggregation levels of L=4 and L=8, and monitors a UE-specific search space of the CCE aggregation levels of L=1, L=2, L=4 and L=8. The common search space and the UE-specific search space may be overlapped with each other.

Furthermore, in the PDCCH search space given to a random user equipment for each CCE aggregation level value, the location of the first CCE (i.e., CCE having the smallest index) is varied per subframe depending on the user equipment. This will be referred to as a PDCCH search space hashing.

Figure 9:
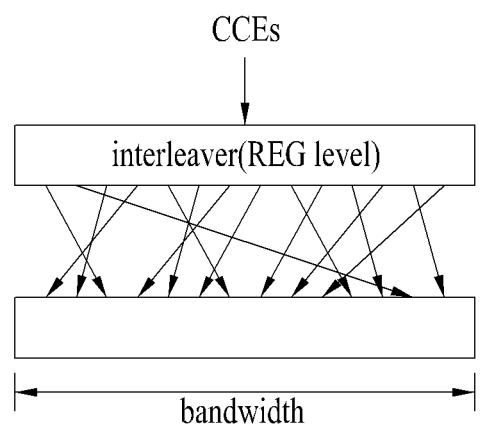
FIG. 9 is a diagram illustrating CCE distribution in a system band.

FIG. 9 is a diagram illustrating an example of a control channel element (CCE) distributed into a system band. Referring to FIG. 9, a plurality of logically continuous CCEs are input to an interleaver. The interleaver performs interleaving of the plurality of CCEs in a unit of REG. Accordingly, the frequency/time resources constituting one CCE are physically distributed into all frequency/time regions within the control region of the subframe. As a result, although the control channel is configured in a unit of CCE, since interleaving is performed in a unit of REG, frequency diversity and interference randomization gain can be maximized.

Figure 10:
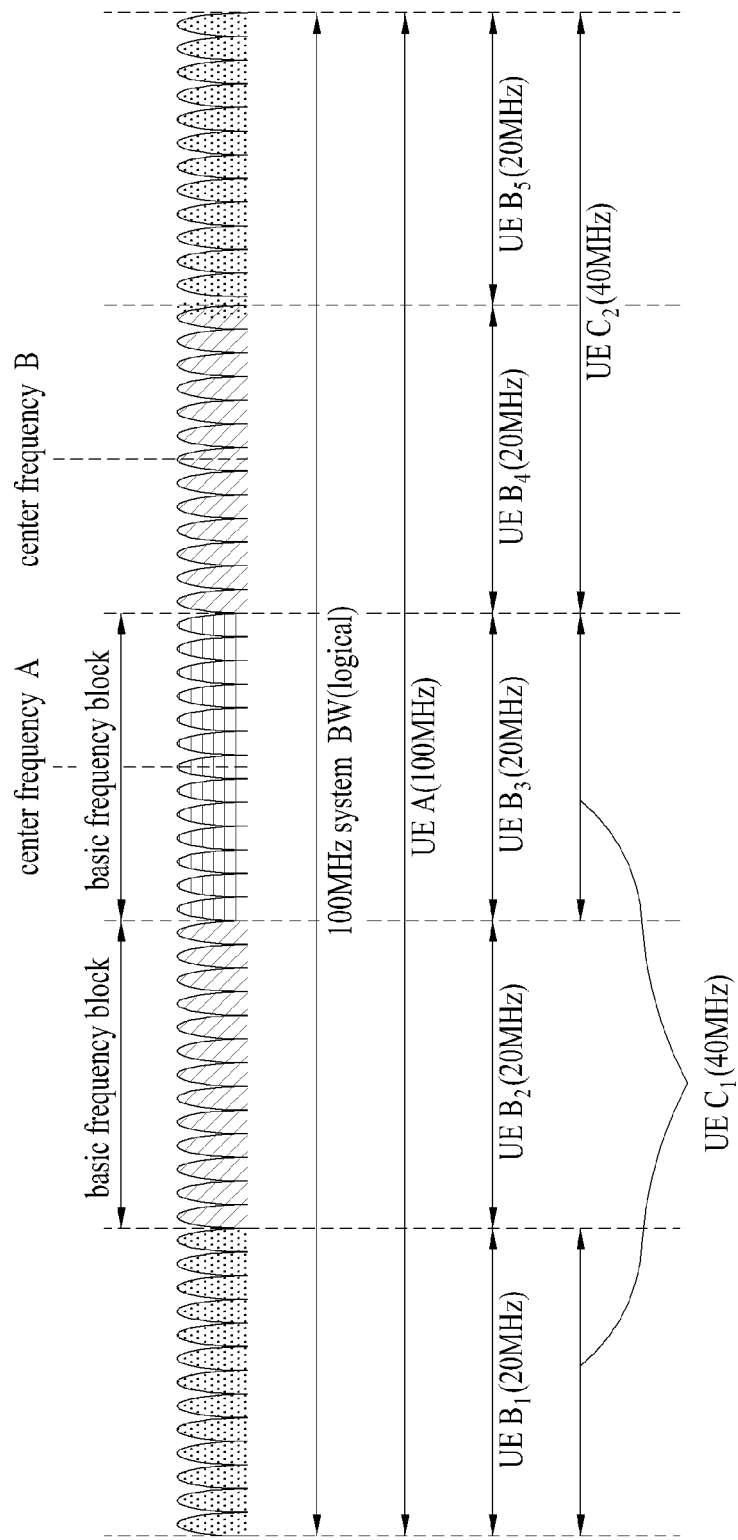
FIG. 10 is a conceptional diagram illustrating carrier aggregation.

FIG. 10 is a conceptional diagram illustrating carrier aggregation. The carrier aggregation means that a plurality of component carriers are used as a huge logical frequency band so that the wireless communication system uses a wider frequency band.

Referring to FIG. 10, all system bandwidths (BW) are logical bandwidths and have a maximum bandwidth of 100 MHz. The system bandwidths include five component carriers, each of which has a maximum bandwidth of 20 MHz. The basic component carrier includes one or more physically continuous subcarriers. Although the respective component carriers have the same bandwidth in FIG. 10, this is only exemplary and the component carriers may have different bandwidths. Also, although it is illustrated that the respective component carriers adjoin each other in the frequency region, this illustration is logically exemplary and the respective component carriers may physically adjoin each other or may be spaced apart from each other.

Center carriers may be used differently for the respective component carriers, or one common center carrier may be used for physically adjoined component carriers. For example, if it is assumed that all component carriers physically adjoin one another in FIG. 10, center carrier A may be used. Also, if it is assumed that the respective component carriers do not adjoin physically one another in FIG. 10, center carrier A and center carrier B may be used separately for the component carriers.

In this specification, the component carrier may correspond to the system band of the legacy system. As the component carrier is defined based on the legacy system, it is possible to facilitate backward compatibility and system design in a radio communication environment where an evolved user equipment and a legacy user equipment coexist. For example, if the LTE-A system supports carrier aggregation, the respective component carrier may correspond to the system band of the LTE system. In this case, the bandwidth of each component carrier may have any one of 1.25, 2.5, 5, 10, and 20 MHz.

If the whole system bandwidth is extended to carrier aggregation, the frequency bandwidth used for communication of user equipments is defined in a unit of component carrier. User equipment A may use 100 MHz which corresponds to the whole system bandwidth, and performs communication using all of five component carriers. User equipments $B_1$ to $B_5$ may use only a bandwidth of 20 MHz and perform communication using one component carrier. User equipments $C_1$ and $C_2$ may use a bandwidth of 40 MHz and perform communication using two component carriers. The two component carriers may or may not logically/physically adjoin each other. The user equipment $C_1$ represents that two component carriers which do not adjoin each other are used, the user equipment $C_2$ represents that two component carriers which adjoin each other are used.

In the mean time, in the current LTE system, the user equipment should perform blind decoding of maximum 44 times to detect the PDCCH transmitted from the base station to the user equipment and acquire downlink control information (DCI) included in the PDCCH. However, in the LTE-A system to which carrier aggregation is applied, since the base station can transmit DCI on each component carrier, according to the current DCI structure, decoding complexity for acquiring DCI on all the component carriers may be increased in proportion to the number of component carriers.

Hereinafter, a method for reducing decoding complexity to allow a user equipment to detect control information allocated thereto in a wireless communication system to which carrier aggregation is applied will be described.

The present invention suggests that a multi-step decoding scheme is provided to reduce blind decoding complexity. For the multi-step decoding scheme, a coordination field that includes a decoding parameter of the user equipment may be transmitted to the user equipment. The coordination field may be used by a new PDCCH format, or may be added to the existing PDCCH format. Also, the coordination field may include one or more of the following.

1) Information indicating resources to which control information for each component carrier is allocated as CCE indexes may be considered. In this case, the CCE indexes include all the CCEs available in the system. Also, the CCE indexes may be associated with component carriers predicted to receive control information, i.e., component carriers established in the user equipment. The indexes of the predicted component carriers may be signaled through an upper layer (for example, RRC layer). The CCE index corresponding to each component carrier may include one or more values. The order of the CCE indexes may be defined in the order signaled from the upper layer, or CC index associated with each CCE index may be transmitted together. In this case, the CCE index may be the location where the user equipment may directly receive the corresponding control information and the location where a format of the corresponding control information is notified.

In the mean time, the indicated CCE index may be beyond the range of the user equipment specific search space. In this case, the user equipment may regard that the indicated CCE index has no DCI corresponding to the corresponding component carrier.

2) Since a method for indicating the CCE index for the range of all the CCEs available in the system may not be preferable in view of signaling overhead, it may be considered that a specific user equipment restricts the range of available CCEs. In this case, the CCE indexes may be expressed by an offset value based on a start point of a user equipment specific search space or an offset value based on an end point of the user equipment specific search space. Also, the CCE indexes may also be expressed by an offset value based on a point where decoding of the coordination field has been successfully performed.

In case of information on the offset value as above, the number of bits for indicating CCE indexes may be reduced. Also, since the user equipment specific search space may be extended in the LTE-A system, a scheduling space for a specific user equipment may be ensured.

Likewise, if the CCE index beyond the range of the search space is indicated, the user equipment may regard that the indicated CCE index has no control information corresponding to the corresponding component carrier.

3) The user equipment searches for control information allocated thereto in a limited space such as the user equipment specific search space. Accordingly, instead of indicating the CCE index, a location index for decoding may be defined in the search space. The defined index may be included in the coordination field.

The user equipment specific search space of Table 1 will be described. If the aggregation level is 1 or 2, the search space may be defined as six sub spaces (candidate PDCCH). If the aggregation level is 4 or 8, the search space may be defined as two sub spaces (candidate PDCCH). In other words, since a total of six sub spaces may exist, the sub spaces that may exist in the specific search space and the aggregation levels corresponding to the sub spaces may be indicated by only information of 4 bits in the LTE system. Hereinafter, information indicating the sub spaces and the aggregation level corresponding to the sub spaces will be referred to as search space indexes.

However, as the carrier aggregation is applied to the LTE-A system, the user equipment specific search space may be extended. Accordingly, a DCI format greater than that of the LTE system may be defined separately. In this case, the aggregation level of the user equipment specific search space and the size of the search space may be increased. Accordingly, it is preferable that the sub spaces and the aggregation levels corresponding to the sub spaces may be indicated using search space indexes of 5 bits or 6 bits to support the extended search space in the LTE-A system. In this case, 32 or 64 sub spaces and aggregation levels corresponding to these sub spaces may be indicated.

In the mean time, instead of indicating the user equipment specific search space for the LTE-A system, a new common search space may be defined. The existing aggregation levels 1, 2, 4 and 8 and new aggregation levels 16 and 32 may be applied to the common search space for the LTE-A system. Since the common search space for the LTE-A system may be located over all or some of the CCEs of the system, its size is greater than the existing user equipment specific search space. Also, since the size of the control information for the LTE-A system may be increased, the common search space may be configured by relatively great aggregation levels such as (4,8), (4,8,16), (4,8,16,32), (8), (8,16), (8,16,32), (16) or (16,32). Also, a CCE region where the common search space is located may include all the logical/physical CCE ranges or the extended PDCCH that can be established in the PDSCH.

Likewise, if a search space index, which is previously occupied, is indicated, the user equipment may regard that the indicated search space index has no control information corresponding to the corresponding component carrier.

4) As another method for reducing blind decoding complexity, candidate aggregation levels may be indicated. Since different aggregation levels exist in the user equipment specific search space as illustrated in Table 1, blind decoding performed using any one or some of the aggregation levels may reduce complexity. However, even though the coordination field including aggregation levels only is received, since blind decoding has to be performed, it is preferable that this method is used together with direct or indirect CCE index indication.

5) A method for indicating a component carrier for searching for downlink control information in a coordination field through bitmap information may be considered. For example, if the user equipment uses three downlink component carriers and one uplink component carrier, bitmap information of 4 bits may be used to indicate that control information on a corresponding component carrier exists. However, information on configuration of a component carrier allocated to the user equipment may be signaled separately through the upper layer, for example, RRC layer. Likewise, since this method does not reduce blinding decoding complexity in the corresponding component carrier, it is preferable that this method is used together with the aforementioned methods 1) to 4).

6) If component carriers are not configured differently, the aforementioned information may be signaled through compression. For example, if the coordination field indicates aggregation levels applied to each of different information codewords, the aggregation level applied to a codeword including the coordination field or the aggregation level applied to one of different control information codewords may be used to indicate the aggregation level applied to the other control information codewords.

In more detail, in order to reduce blind decoding complexity of the control information codewords for N downlink component carriers, it is assumed that the aggregation levels or search space indexes or CCE indexes are indicated through the coordination field. In this case, two methods may be expressed as follows.

i) First of all, according to a method based on a codeword including the coordination field, information included in the coordination field may be expressed as $[\Delta_1, \Delta_2, \Delta_3, \Delta_4, \ldots, \Delta_N]$. In this case, $\Delta_k$ means a difference value between an aggregation level, a search space index or CCE index of a codeword including the coordination field and an aggregation level, search space index or CCE index of the kth control information codeword.

ii) Next, according to a method based on any one control information codeword indicated by the coordination field, information included in the coordination field may be expressed as [FullValue, $\Delta_2, \Delta_3, \Delta_4, \ldots, \Delta_N$]. In this case, $\Delta_k$ means a difference value between an aggregation level, a search space index or CCE index of the any one control codeword information and an aggregation level, search space index or CCE index of the kth control information codeword. Also, FullValue is not an offset value but a value directly indicating an aggregation level, a search space index or CCE index of the any one control codeword information. Also, the any one control information codeword is a control information codeword for a reference component carrier.

7) Configuration information of downlink component carrier: if the information included in the coordination field indicates a decoding position of another component carrier, a component carrier indicating the decoding position may be included in the coordination field. In other words, although channel configuration included in the component carrier including the coordination field is already identified through acquisition of the coordination field, control channel information included in another component carrier indicating a decoding position should be identified. It is preferable that a value of a channel such as PCFICH that can identify configuration information of the control channel is identified before the user equipment acquires scheduling information on the component carrier indicating a decoding position. Accordingly, it is preferable that the value of the channel such as PCFICH of the corresponding component carrier is included in the coordination field and used together with a search position of the corresponding component carrier.

Hereinafter, a codeword for transmitting the aforementioned coordination field will be described. The coordination field may be coded independently from or in combination with other control information such as user equipment specific grant information in accordance with the size of information that can be included in one codeword. In both cases of independent coding and combination coding, although the coordination field may be acquired through blind decoding, the other control information may be acquired through blind decoding in accordance with a parameter indicated by the coordination field, or may be acquired through non-blind decoding.

A) First of all, a coordination field codeword subjected to independent coding will be described. If the coordination field codeword is generated by independent coding, the coordination field codeword does not include user equipment specific grant information. Also, the coordination field codeword is acquired using blind decoding in the user equipment specific search space. In this case, the range of the user equipment specific search space may be limited to a specific CCE region to reduce blind decoding complexity.

In the mean time, if sizes of control information for an uplink component carrier indicated by the coordination field and control information for a downlink component carrier are sufficiently small, the control information for an uplink component carrier and the control information for a downlink component carrier may be transmitted through one codeword. However, if the sizes of control information for an uplink component carrier indicated by the coordination field and control information for a downlink component carrier are too great to be transmitted through one codeword, the control information for an uplink component carrier and the control information for a downlink component carrier should be transmitted separately through two codewords.

If the base station transmits the control information for an uplink component carrier and the control information for a downlink component carrier through one codeword, the user equipment decodes one codeword to obtain the aforementioned control information. In this case, although the same complexity as that of the LTE system may be ensured. However, if the control information for an uplink component carrier and the control information for a downlink component carrier are transmitted through two coordination fields, a problem occurs in that additional complexity, i.e., the number of blind decoding times may be increased.

B) Next, a coordination field codeword subjected to combination coding will be described. For combination coding of control information such as specific grant information and the coordination field, a codeword longer than that of the codeword defined in the existing system is required.

In this case, transmission of the coordination field codeword subjected to combination coding cannot be ensured by the CCE size only supported by the existing LTE system. Accordingly, for transmission of the coordination field based on the combination coding, it is preferable that the CCE aggregation level is increased to 16 or 32.

On the other hand, the control information for an uplink component carrier and the control information for a downlink component carrier are subjected to combination coding by one coordination field codeword. The user equipment acquires the coordination field codeword subjected to combination coding through blind decoding and decodes the other control information codewords by using the acquired coordination field codeword. In this case, the control information for an uplink component carrier and the control information for a downlink component carrier may be defined by different formats. In this case, the user equipment needs to detect the control information for an uplink component carrier and the control information for a downlink component carrier at the same time.

In the mean time, the coordination field codeword, the grant information codeword and the other control information codewords may be transmitted through one component carrier or component carriers allocated to a specific user equipment. Also, if all kinds of scheduling information are subjected to combination coding, the coordination field for indicating the information subjected to combination coding may be expressed by smaller bits.

Hereinafter, the coordination field codeword according to the aforementioned methods will be described with reference to the accompanying drawings.

Figure 11:
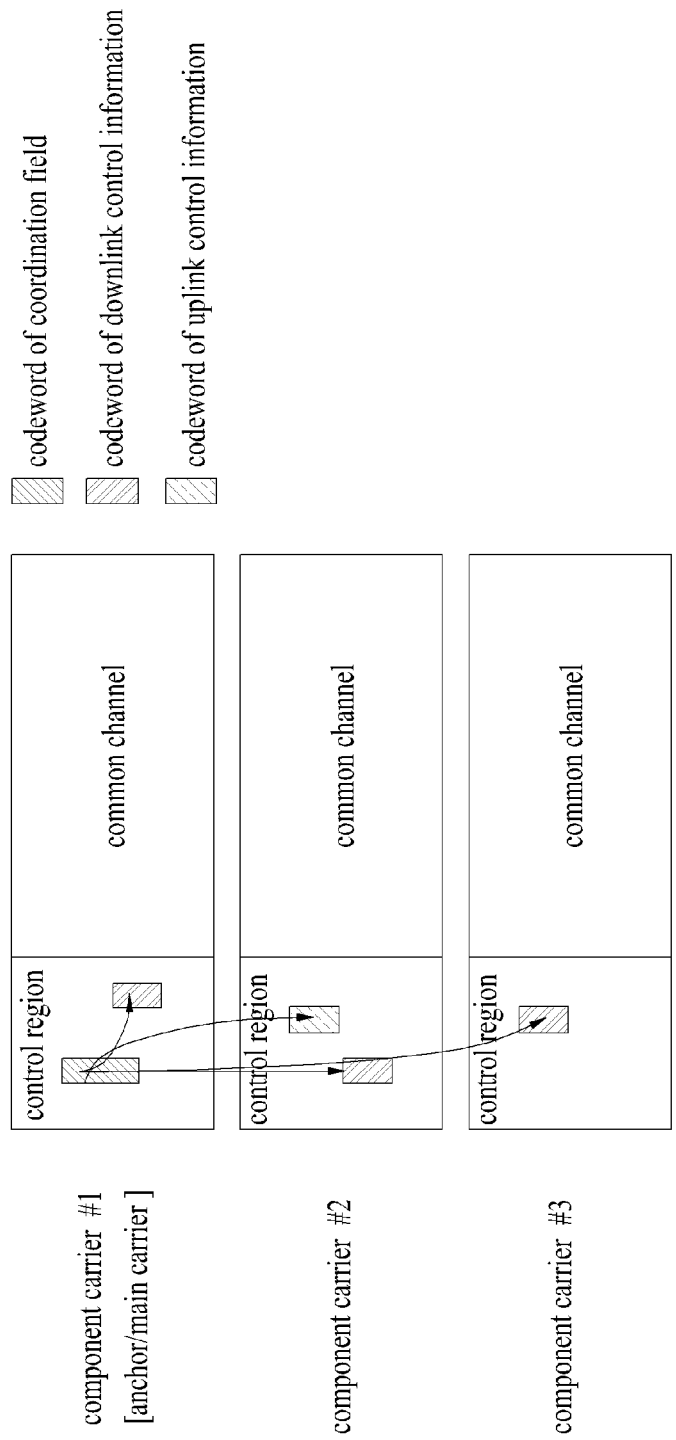
FIG. 11 is a diagram illustrating a coordination field according to the embodiment of the present invention.

FIG. 11 is a diagram illustrating a coordination field according to the embodiment of the present invention. In particular, the coordination field codeword of FIG. 11 is coded separately from other control information codewords. FIG. 11 illustrates that the control information for an uplink component carrier and the control information for a downlink component carrier are subjected to combination coding by one coordination field codeword.

Referring to FIG. 11, the coordination field codeword is transmitted through a specific component carrier indicated by the base station. Accordingly, the user equipment may acquire the coordination field codeword from all the component carriers without search. The specific component carrier may be indicated by the upper layer explicitly or implicitly. Alternatively, the specific component carrier may be set to be transmitted through the reference component carrier. However, for the LTE-A system only, the user equipment may configure a component carrier, which is intended to search for the coordination field codeword, without limitation.

Figure 12:
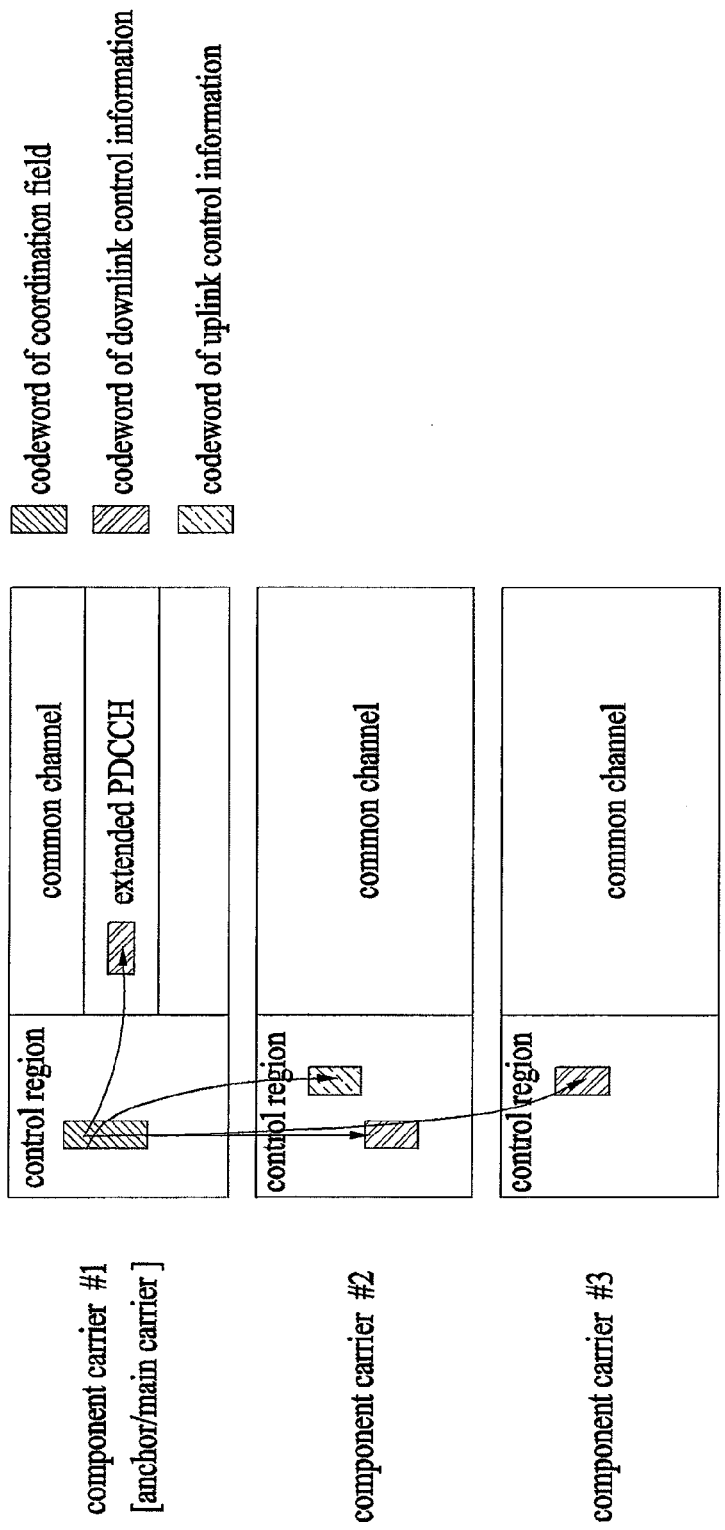
FIG. 12 is a diagram illustrating another coordination field according to the embodiment of the present invention.

FIG. 12 is a diagram illustrating another coordination field according to the embodiment of the present invention. In particular, the coordination field codeword of FIG. 12 is defined for the LTE-A system, and further includes information on extended PDCCH transmitted from the PDSCH region.

Referring to FIG. 12, the control information for an uplink component carrier and the control information for a downlink component carrier may be signaled to the user equipment through at least one of legacy control regions, i.e., PDCCH region and extended PDCCH region. In this case, the coordination field codeword includes information on the extended control channel region, and the user equipment should identify a type of the extended PDCCH that may exist in a specific component carrier, through signaling from the upper layer. The extended PDCCH may include R-PDCCH region used by a relay.

Figure 13:
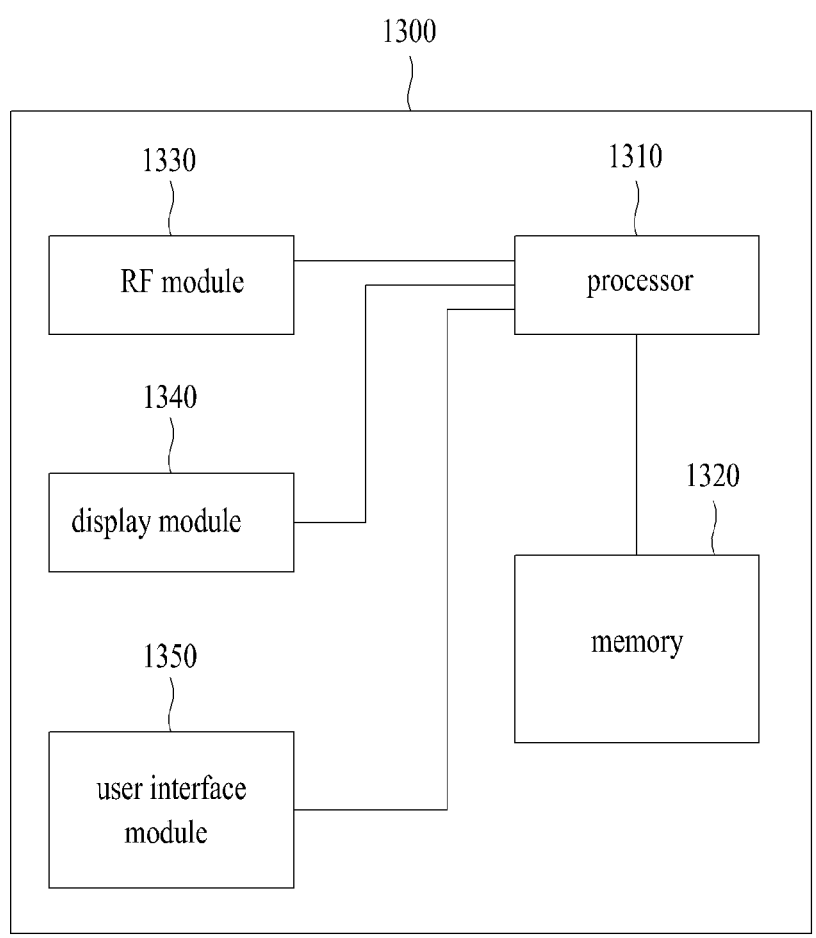
FIG. 13 is a diagram illustrating a transmitter and a receiver, which can be applied to one embodiment of the present invention.

FIG. 13 is a diagram illustrating a communication transceiver according to the embodiment of the present invention. The transceiver may be a part of the base station and the user equipment.

Referring to FIG. 13, the transceiver 1300 includes a processor 1310, a memory 1320, a radio frequency (RF) module 1330, a display module 1340, and a user interface module 1350. The transceiver 1300 is illustrated for convenience of description, and some of its modules may be omitted. Also, the transceiver 1300 may further include necessary modules. Moreover, some modules of the transceiver 1300 may be divided into segmented modules. The processor 1310 is configured to perform the operation according to the embodiment of the present invention illustrated with reference to the drawings. If the transceiver 1300 is a part of the base station, the processor 1310 may generate a control signal and map the control signal into a control channel configured within a plurality of component carriers. In more detail, the processor 1310 of the transceiver 1300 which is a part of the base station may map a coordination field including decoding parameters and control information for each component carrier into the control channel. In this case, it is preferable that the decoding parameters included in the coordination field indicate position or range (for example, CCE index where the control information is located, a position for decoding in a search space, search space index indicating an aggregation level corresponding to the position for decoding, an aggregation level of the control information, or information as to whether the control information exists in one or more component carriers allocated to the user equipment) of resources allocated to the control information for each component carrier. More preferably, the coordination field is mapped into the control channel configured in a reference component carrier of a plurality of component carriers.

Also, if the transceiver 1300 is a part of the user equipment, the processor 1310 may identify the control channel indicated by a signal received from the plurality of component carriers and extract the control signal from the control channel. Afterwards, the processor 1310 may perform the operation required based on the control signal. In more detail, the processor 1310 of the transceiver 1300 which is a part of the user equipment acquires parameters for decoding control information for each component carrier by receiving the coordination field. The processor 1310 may receive the control information without blind decoding or reduce the number of blind decoding times by using the parameters. If the base station transmits the coordination field through the reference component carrier, the processor 1310 of the user equipment preferably performs blind decoding for the control region of the reference component carrier to acquire the coordination field. The memory 1320 is connected with the processor 1310 and stores an operating system, an application, a program code, and data therein. The RF module 1330 is connected with the processor 1310 and converts a baseband signal to a radio signal or vice versa. To this end, the RF module 1330 performs analog conversion, amplification, filtering and frequency uplink conversion, or their reverse processes. The display module 1340 is connected with the processor 1310 and displays various kinds of information. Examples of the display module 1340 include, but not limited to, a liquid crystal display (LCD), a light emitting diode (LED), and an organic light emitting diode (OLED). The user interface module 1350 is connected with the processor 1310, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention can be applied to a wireless communication system. More specifically, the present invention may be applied to a method for receiving control information in a user equipment of a wireless communication system to which carrier aggregation is applied.

The invention claimed is:

1. A method for receiving downlink control information by a user equipment in a wireless communication system to which carrier aggregation is applied, the method comprising:
    receiving a coordination field from a base station through a reference component carrier; and
    receiving control information through a plurality of component carriers including the reference component carrier based on the coordination field,
    wherein:
        the coordination field includes one or more parameters for decoding the control information on the plurality of component carriers,
        the one or more parameters comprise at least one of a first type set of at least one difference value between a Control Channel Element (CCE) index of a control information including the coordination field and a CCE index of a $k_{th}$ control information and a second type set of a CCE index of a specific control information and at least one difference value between the CCE index of the specific control information and a CCE index of an $l_{th}$ control information,
        the CCE index of the specific control information is located at a start of the second type set and associated with a specific component carrier except the reference component carrier or an extended Physical Downlink Control Channel (PDCCH) of the reference component carrier,
        if one of the one or more parameters correspond to the first type set, the first type set indicates locations of control information for the reference component carrier,
        if one of the one or more parameters correspond to the second type set and the CCE index of the specific control information associated with the specific component carrier, the second type set indicates locations of control information for the specific component carrier, and
        if one of the one or more parameters correspond to the second type set and the CCE index of the specific control information is associated with the extended PDCCH, the second type set indicates locations of control information for the reference component carrier, carried by the extended PDCCH region of the reference component carrier.

2. The method according to claim 1, wherein the one or more parameters further include a search space index indicating a position for decoding in a search space and an aggregation level corresponding to the position for decoding.

3. The method according to claim 1, wherein the one or more parameters further include at least one of the aggregation level of the control information and information as to whether the control information exists in the plurality of component carriers allocated to the user equipment.

4. The method according to claim 1, wherein the one or more parameters further comprise bitmap information which indicates existence of the control information on the corresponding component carrier.

5. A user equipment in a wireless communication system to which carrier aggregation is applied, the user equipment comprising:
    a receiving module configured to receive a coordination field from a base station through a reference component carrier and receive control information through a plurality of component carriers including the reference component carrier; and
    a processor configured to acquire the control information based on the coordination field,
    wherein:
        the coordination field includes one or more parameters for decoding the control information on the plurality of component carriers,
        the one or more parameters comprise at least one of a first type set of at least one difference value between a Control Channel Element (CCE) index of a control information including the coordination field and a CCE index of a $k_{th}$ control information and a second type set of a CCE index of a specific control information and at least one difference value between the CCE index of the specific control information and a CCE index of an $l_{th}$ control information,
        the CCE index of the specific control information is located at a start of the second type set and associated with a specific component carrier except the reference component carrier or an extended Physical Downlink Control Channel (PDCCH) of the reference component carrier,
        if one of the one or more parameters correspond to the first type set, the first type set indicates locations of control information for the reference component carrier,
        if one of the one or more parameters correspond to the second type set and the CCE index of the specific control information associated with the specific component carrier, the second type set indicates locations of control information for the specific component carrier, and
        if one of the one or more parameters correspond to the second type set and the CCE index of the specific control information is associated with the extended PDCCH, the second type set indicates locations of control information for the reference component carrier, carried by the extended PDCCH region of the reference component carrier.

6. The user equipment according to claim 5, wherein the one or more parameters further include a search space index indicating a position for decoding in a search space and an aggregation level corresponding to the position for decoding.

7. The user equipment according to claim 4, wherein the one or more parameters further include at least one of the aggregation level of the control information and information as to whether the control information exists in the one or more component carriers allocated to the user equipment.

8. The user equipment according to claim 5, wherein the one or more parameters further comprise bitmap information which indicates existence of control information on the correspondent component carrier.

9. The method according to claim 1, further comprising:
   receiving information on a type of the extended PDCCH via upper layer.

10. The method according to claim 1, wherein:
   the extended PDCCH is located in a data region of a subframe.

* * * * *